May 23, 1950 — R. H. COOK ET AL — 2,508,494
GAUGE
Filed Sept. 30, 1944 — 2 Sheets-Sheet 1
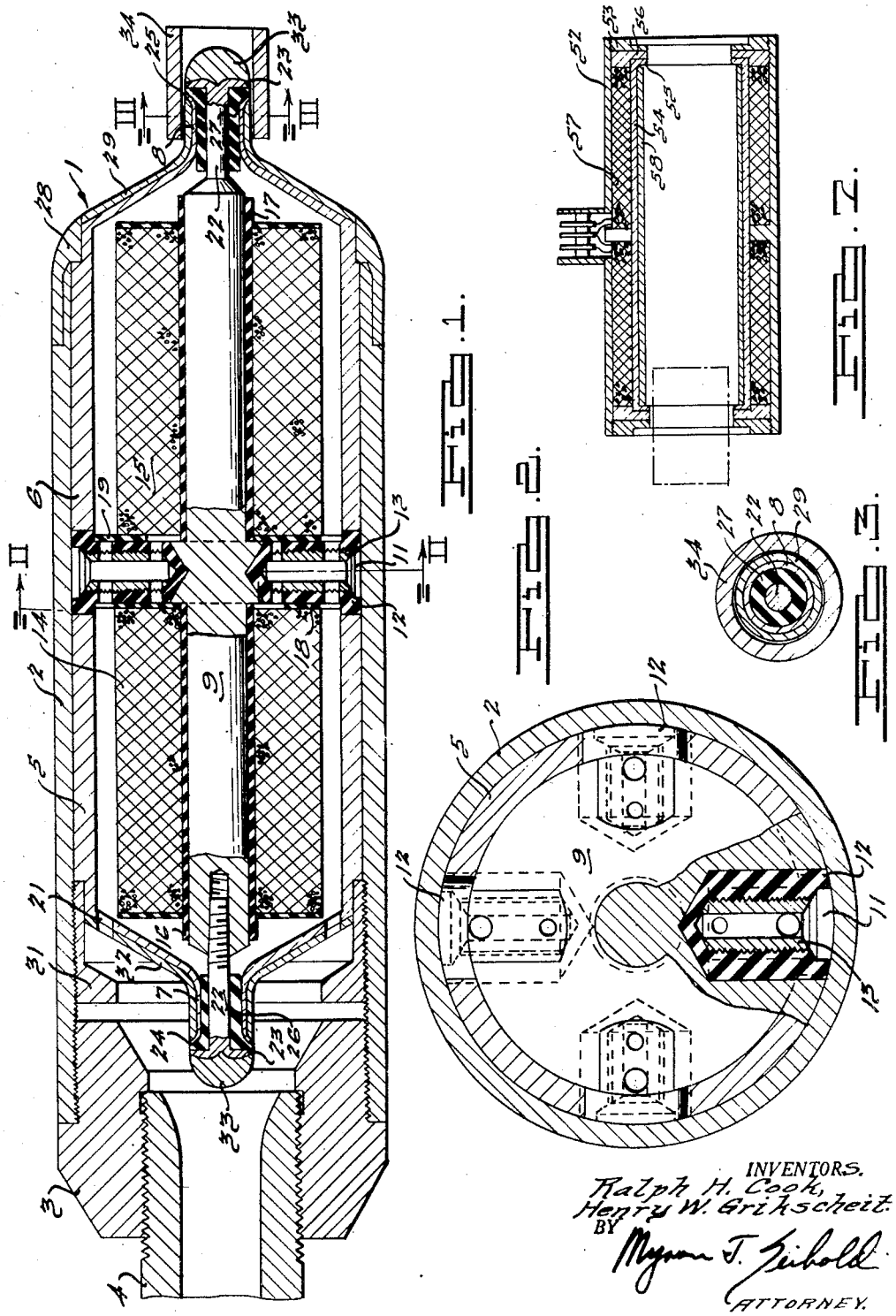
INVENTORS.
Ralph H. Cook,
Henry W. Grihscheit.
BY Myron J. Siebold
ATTORNEY.

May 23, 1950 R. H. COOK ET AL 2,508,494
GAUGE
Filed Sept. 30, 1944 2 Sheets-Sheet 2

INVENTORS.
Ralph H. Cook,
Henry W. Grikscheit.
BY
Myron J. Seibold
ATTORNEY.

Patented May 23, 1950

2,508,494

UNITED STATES PATENT OFFICE 2,508,494

GAUGE

Ralph H. Cook, Ferndale, and Henry W. Grikscheit, Detroit, Mich.

Application September 30, 1944, Serial No. 556,548

2 Claims. (Cl. 175—183)

This invention relates to an electric gauge for measuring the diameter of a cylindrical surface on a work piece formed of magnetic material.

An object of the invention is to provide a gauge for measuring the diameter of a cylindrical surface of a work piece without the necessity of physical contact of the gauge or a feeler thereon with the work piece surface.

Another object of the invention is to provide an electric gauge employing a bridge circuit in which the diameter of a work piece surface is determined by the change of impedance of a leg of the bridge circuit incident to the placing of the work piece within a magnetic field.

Another object of the invention is to provide an electric gauge for measuring the diameter of the cylindrical surface on a magnetic work piece including spaced cylindrical pole pieces associated with the work piece to include it in the magnetic circuit through the pole pieces.

Another object of the invention is to provide an electric gauge employing two similar magnetic circuits having energizing coils therefor in which the coils are disposed in separate legs of a bridge circuit and in which a magnetic work piece is associated with one pair of spaced poles to change the impedance of the coil associated therewith to unbalance the bridge circuit and thereby indicate the diameter of a cylindrical surface of the work piece.

Other objects and features of the invention will be readily apparent to those skilled in the art from the specification and appended drawings illustrating certain preferred embodiments in which:

Figure 1 is a longitudinal sectional view through an electric gauge according to the present invention.

Figure 2 is a transverse sectional view on the line II—II of Figure 1.

Figure 3 is a sectional view on the line III—III of Figure 1.

Figure 7 is a partial view of an electric gauge for measuring an external diameter of a cylindrical work piece.

Figure 4:
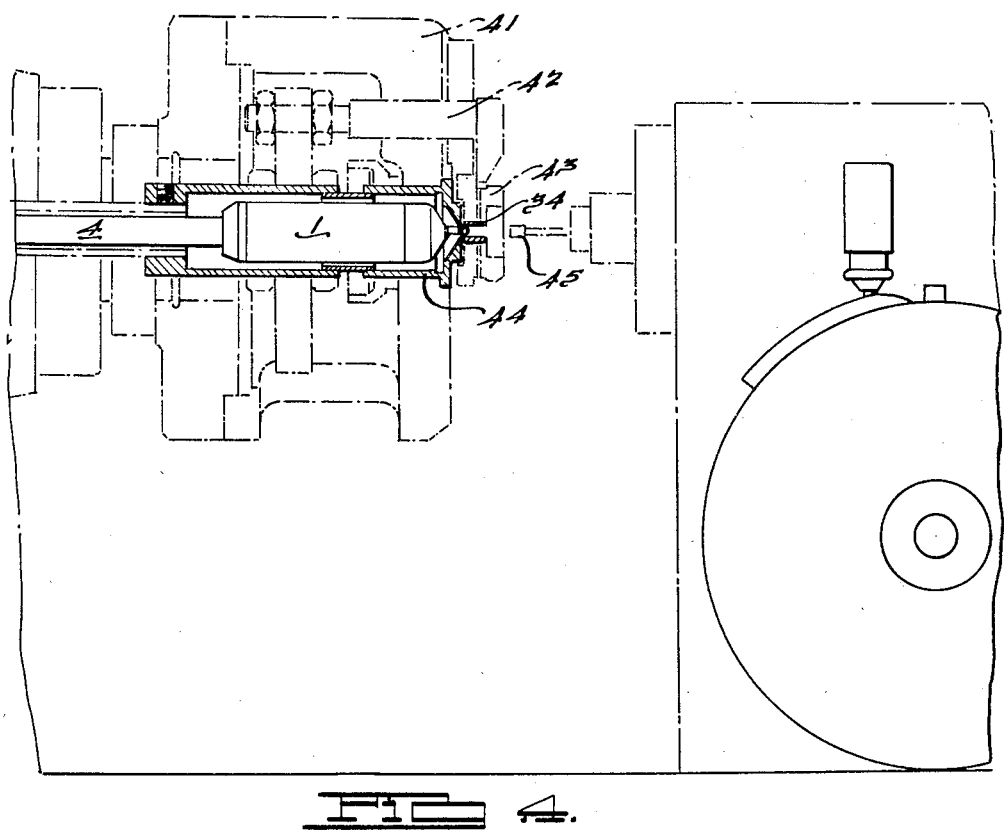
Figure 4 is a schematic representation of the association of the electric gauge according to the present invention with an automatic sizing machine.

The electric gauge 1 shown in Figures 1, 2 and 3 comprises an outer cylindrical sleeve 2 of brass or other non-magnetic conducting material in which is threaded a tail piece 3 of non-magnetic conducting material, the tail piece 3 being mounted upon a supporting tube 4 for automatic operating in connection with the machine of Figure 4. Within the sleeve 2 are disposed a pair of opposed cup-shaped elements 5 and 6 of magnetic material formed at their remote ends into elongated necks 7 and 8. Within the cup-shaped members 5 and 6 is disposed an elongated magnetic core 9 having a generally cylindrical central flange 11 extending therefrom and to the interior surface of the outer casing 2, the adjacent ends of the cup-shaped members 5 and 6 extending to said central flange and overlapping cut-back portions at opposite sides thereof. Within the flange 11 are four cylindrical portions receiving insulating blocks 12 and conducting terminal lugs 13 threaded therein. About the elongated core 9 on opposite sides of the central flange 11 are disposed a pair of coils 14 and 15, the coils being wound about insulating sleeves 16 and 17. Between the inner ends of the coils and the central flange 11 are insulating plates 18 and 19 which have openings registering with openings through the insulating blocks 12 and terminal lugs 13 to permit the connection of circuit wiring from the coils to the lugs. The cup-shaped element 5 is provided with openings indicated at 21 for the entrance of circuit wires extended through tube 4, openings 21 and openings in the insulating plate 18 and blocks 12 into contact with the terminal lugs 13.

The exterior circuit wiring and the connections from the coils to the terminal lugs have been omitted from Figures 1 and 2 for clarity.

Into the ends of the core 9 are threaded magnetic studs 22 having integral flat magnetic heads 23. The necks 7 and 8 of the cup-shaped elements 5 and 6 are flared at 24 and 25 to provide narrow cylindrical pole pieces cooperating with the narrow cylindrical pole pieces formed by the stud heads 23. Headed insulating sleeves 26 and 27 are provided to space the studs 22 from the neck 7 and also to properly space the pole pieces 23—24 and 23—25. At the forward end of the outer sleeve 2 is disposed a non-magnetic conducting thrust ring 28 in overlapping relation therewith, and between the ring 28 and the pole piece 25 the outer surface of the closed end of the cup-shaped element 6 and of the neck 8 is provided with a flux shielding coating 29 of non-magnetic conducting material. In the back end of the outer casing 2 is threaded the ring 31 of non-magnetic conducting material against which the cup-shaped member 5 presses, and extending on the outer surface of the closed end of the cup-shaped element 5 and of the neck 7 is a flux shielding coating 32 of non-magnetic conducting material which extends from the ring 21 to the pole piece 24. The magnetic heads 23 are provided with flux shielding coatings 33 of non-magnetic conducting material. The magnetic circuit for the coil 15 embodies the cylindrical pole piece 23, studs 22, the right hand end of core 9, flange 11, and the cup-shaped element 6, including the neck 8 terminating in the pole piece 27 spaced from the pole piece 23. Similarly, the magnetic circuit for the coil 14 comprises the cylindrical magnetic pole piece 23, stud 22, the left hand portion of core 9, central flange 11, and cup-shaped element 5 including the neck 7 terminating in the pole piece 24 spaced from the pole piece 23.

In Figures 1 and 3, the work piece is indicated at 34 positioned to lessen the air gap across the pole pieces 23 and 25. Without the work piece, the impedances of the coils 14 and 15 are substantially balanced since the magnetic circuits for the coils are substantially alike. If desired, these impedances can be made identical by adjustment of the spacing between the pole pieces 23 and 24, but this is not essential as any unbalance can be taken care of in the adjustment of the bridge circuit.

Figure 5:
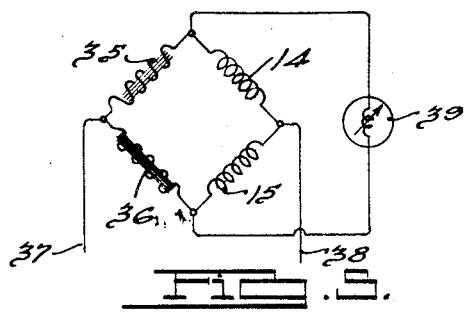
Figure 5 is a wiring diagram of a simple bridge circuit in which the gauge is electrically connected to secure an indication of the diameter to be measured.

The operation of the electric gauge according to the present invention will first be described in connection with the simplified bridge circuit shown in Figure 5. Here the gauge coils 14 and 15 are placed in a bridge with inductances 35 and 36, either or both of which may be adjustable to effect a balance of the bridge circuit. Current is supplied through the leads 37 and 38. From the mid-points of the bridge, connection is made to the meter 39. The bridge may be adjusted for balance with no current flowing through the meter 39 when the gauging head is not inserted within the bore of the work piece 34. When the gauging head and the work piece are thereafter associated, as shown in Figure 1, the impedance of coil 15 will be increased due to the lessening of the air gap between the pole pieces 23 and 25. This increased impedance is a function of the diameter of the bore of the work piece and will effect an unbalance in the bridge circuit which is a function of the bore diameter. The bridge unbalance will be reflected in an indication at the meter 39, the calibrated reading of which will indicate the diameter of the work piece.

The above description is based upon the use of the gauge with a work piece of magnetic material. The operation with a work piece of non-magnetic conducting material is similar except that the unbalance is in the opposite direction, as the impedance of coil 15 will be reduced by the counter-flux set up by eddy currents induced in the work piece.

It is seen that this gauging operation requires no contact between the gauging head and the work piece so that no wear of the gauge results which might impair its accuracy. Furthermore, it is unnecessary for the gauge to be inserted centrally of the bore, as the meter indication will accurately measure the bore diameter if the axes of the gauge and work piece are eccentric and, in fact, the work piece and gauge head may be in physical contact without materially changing the reading indication.

Applicant's electric gauge is adapted for use as a manually operated bench tool or it may be associated with a sizing machine for effecting an automatic gauging operation. Such an arrangement is schematically illustrated in Figure 4 in which a grinding machine is illustrated having a head chuck 41 carrying peripherally spaced clamps 42 for holding a work clamping piece 43. Within the chuck is disposed a sleeve 44 within which the gauge 1 is reciprocable by the shaft 4. A cutting wheel or other device for removing stock from the work piece is indicated at 45. The operation of a machine of this character is well known in the art in that after the bore of the work piece has been increased to a predetermined diameter, each successive pass of the cutting wheel 45 is accompanied, upon its removal to the position shown in Figure 4, by the insertion of the gauging tool into the bore. This motion continues, alternately removing stock from the bore and inserting the gauge until the bore has the desired diameter at which time the cutting operation is terminated.

Figure 6:
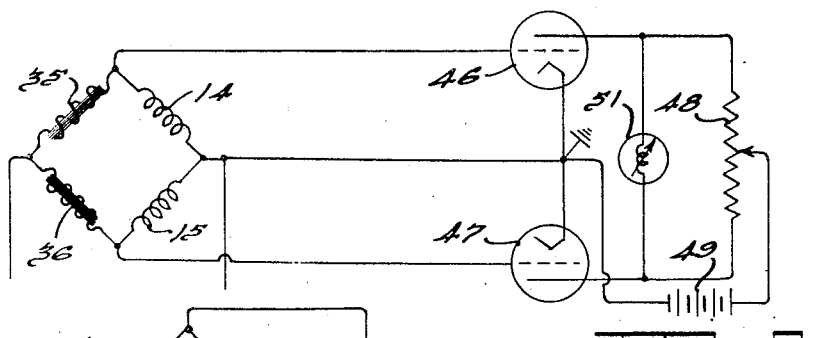
Figure 6 is a wiring diagram of a more sensitive measuring system.

In Figure 6 has been illustrated a circuit for small bore work pieces where the sensitivity is such that the desired tolerances cannot be read upon a direct reading instrument. Here, the mid-points of the bridge circuit formed by the gauge coils 14 and 15 and the inductances 35 and 36 are connected to the grids of triode vacuum tubes 46 and 47, the plates of which are connected to a resistor 48 to which is adjustably connected one terminal of a B-voltage supply 49, the other terminal of which is connected to the cathodes of the triode tubes. The indicating device at 51 may be a meter, cathode ray tube, electric eye, balance coil meter, or any other desired responsive device adapted to the circuit. With the arrangement of Figure 6, when the bridge consisting of coils 14 and 15 and inductances 35 and 36 is in balance the voltages across the grids of tubes 16 and 17 are equal so that equal currents flow through the two halves of the resistor 48 and no indication is given upon the meter 51. When the bridge becomes unbalanced by the insertion of the work piece in the air gap across pole pieces 23 and 25, unequal voltages will be applied to the grids of the triodes and unequal currents will flow through the two halves of the resistor 48 producing a current flow through meter 51 giving an indication of the amount of unbalance of the circuit and indicating the diameter of the work piece. The adjustable connection of the B-voltage source to the resistor 48 provides a means for effecting an electronic balance of the circuit when the work piece is not in the magnetic circuit even though the impedances of the coils 14 and 15 should be unequal so that the bridge in which they are placed is unbalanced. Hence, variations in the construction of the gauge which result in different impedances for the coils 14 and 15 therein may be readily compensated in the system of Figure 6 either by adjustment of the inductances 35 and 36 or by changing the tap point connection of the B-voltage supply with the resistor 48.

In Figure 7 is shown, in longitudinal section, one end of a gauge for measuring the diameter of an external cylindrical surface of a work piece, embodying a magnetic sleeve 52 in which is disposed a cylindrical magnetic pole piece 53. Within the outer sleeve 52 is an inner magnetic sleeve 54 terminating in a cylindrical pole piece 55 separated from the pole piece 53 by a cylindrical insulating member 56. One of the energizing coils for the gauge is indicated at 57. A similar magnetic pole piece arrangement is provided at the opposite end of the head. A cylindrical shield of non-magnetic conducting material is indicated at 58. The operation of the head of Figure 7 is identical with that of Figures 1, 2 and 3 except that the sizing is now being made upon an external rather than an internal diameter of the work piece.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In an electrical gauge, a magnetic core, a pair of energizing coils about said core, a magnetic circuit at the exterior of said coils, a magnetic member between said coils connecting said core and exterior magnetic circuit to produce a pair of similar magnetic circuits each energized by one of said coils, the ends of said core and of said magnetic circuit terminating in spaced cylindrical pole pieces to establish a pair of cylindrical air gaps, means for energizing said coils to establish magnetic fields across said cylindrical air gaps, means for associating a cylindrical surface work piece with one only of said air gaps, and means for measuring the unbalance in the impedance of said coils occasioned by the presence of said work piece to indicate the diameter of the surface thereof immediately adjacent the pole pieces of the air gap with which it is associated.

2. In an electrical gauge, a magnetic core, a pair of energizing coils about said core, a magnetic circuit at the exterior of said coils, a magnetic member between said coils connecting said core and exterior magnetic circuit to produce a pair of similar magnetic circuits each energized by one of said coils, the ends of said core and of said magnetic circuit terminating in spaced cylindrical pole pieces to establish a pair of cylindrical air gaps, means for energizing said coils to establish magnetic fields across said cylindrical air gaps, means for associating a cylindrical surface work piece with one only of said air gaps, a balanced bridge circuit in which said coils constitute two of the legs, and means responsive to the unbalance of the bridge occasioned by the presence of said work piece for indicating the diameter thereof.

RALPH H. COOK.
HENRY W. GRIKSCHEIT.

REFERENCES CITED

The following references are of record in the file of this patent:

UNITED STATES PATENTS

| Number | Name | Date |
|---|---|---|
| 2,055,672 | Roop | Sept. 29, 1936 |
| 2,076,944 | Howe | Apr. 23, 1937 |
| 2,104,643 | Greenslade | Jan. 4, 1938 |
| 2,104,646 | Greenslade | Jan. 4, 1938 |
| 2,248,569 | Ellwood | July 8, 1941 |
| 2,250,703 | Crites et al. | July 29, 1941 |
| 2,351,595 | Bindschedler et al. | June 20, 1944 |

FOREIGN PATENTS

| Number | Country | Date |
|---|---|---|
| 368,006 | Great Britain | Mar. 3, 1932 |
| 664,814 | France | Apr. 29, 1929 |

OTHER REFERENCES

Electronic Industries, April 1944, pages 94, 95, 198 and 200.